Sept. 14, 1954 P. K. WEIMER 2,689,271

COLOR TELEVISION CAMERA

Filed April 5, 1952 3 Sheets-Sheet 1

INVENTOR
Paul K. Weimer
BY
[signature]
ATTORNEY

Sept. 14, 1954 P. K. WEIMER 2,689,271

COLOR TELEVISION CAMERA

Filed April 5, 1952 3 Sheets-Sheet 2

INVENTOR
Paul K. Weimer
BY
[signature]
ATTORNEY

INVENTOR
Paul K. Weimer
BY
[signature]
ATTORNEY

Patented Sept. 14, 1954 2,689,271

UNITED STATES PATENT OFFICE 2,689,271

COLOR TELEVISION CAMERA

Paul K. Weimer, Princeton, N. J., assignor to Radio Corporation of America, a corporation of Delaware Application April 5, 1952, Serial No. 280,757

9 Claims. (Cl. 178—5.4)

This invention relates to apparatus for deriving signals representative of the intensity of each of several primary colors as an object to be televised is being scanned.

In previously known arrangements for deriving color signals, light emanating from the object is passed through an optical color filter before striking the light responsive target of the camera tube. The filter operates to permit only one primary color light band to reach any one of a given group of areas of the target. As the electron beam in the camera tube scans across the target, it successively passes through areas struck by light of different primary colors. If the effective cross sectional area of the beam is sufficiently large, or if the different areas are too close together, the beam may strike more than one area at a time, and consequently, the signals produced represent more than one color at a time. If each color signal is to correspond to the intensity of only one color, the maximum effective area of the beam must be severely restricted.

One of the features of this invention is to provide a color camera tube wherein the effective cross sectional area of the beam may be larger than the individual color areas without producing cross talk between the signals representing the different colors.

A primary object of this invention is to provide an improved color television camera having no registry problems.

Another object of this invention is to reduce color cross talk in color television pick-up systems without severely limiting the beam size or the detail that can be represented.

In a system wherein the signal is to successively represent different colors, this may be accomplished in accordance with embodiments of this invention by repeatedly bringing the beam to rest at different points in a line of the raster and controlling the effective area of the beam so that it encompasses at least one area of each color. Means are provided for charging the different color areas to different set levels. The charge due to the scene light falling on these areas is added to the set levels and is limited so as not to exceed the range between levels. The potential of the whole target is successively changed while the beam is at rest so as to enable the beam to successively discharge the different color areas. Means are also provided for separating the beam current components caused by the biasing means from the beam current components produced in response to the scene light falling on the different areas.

The manner in which the above objectives and other advantages of this invention may be realized will be better understood from a detailed consideration of the drawings in which.

Figure 1:
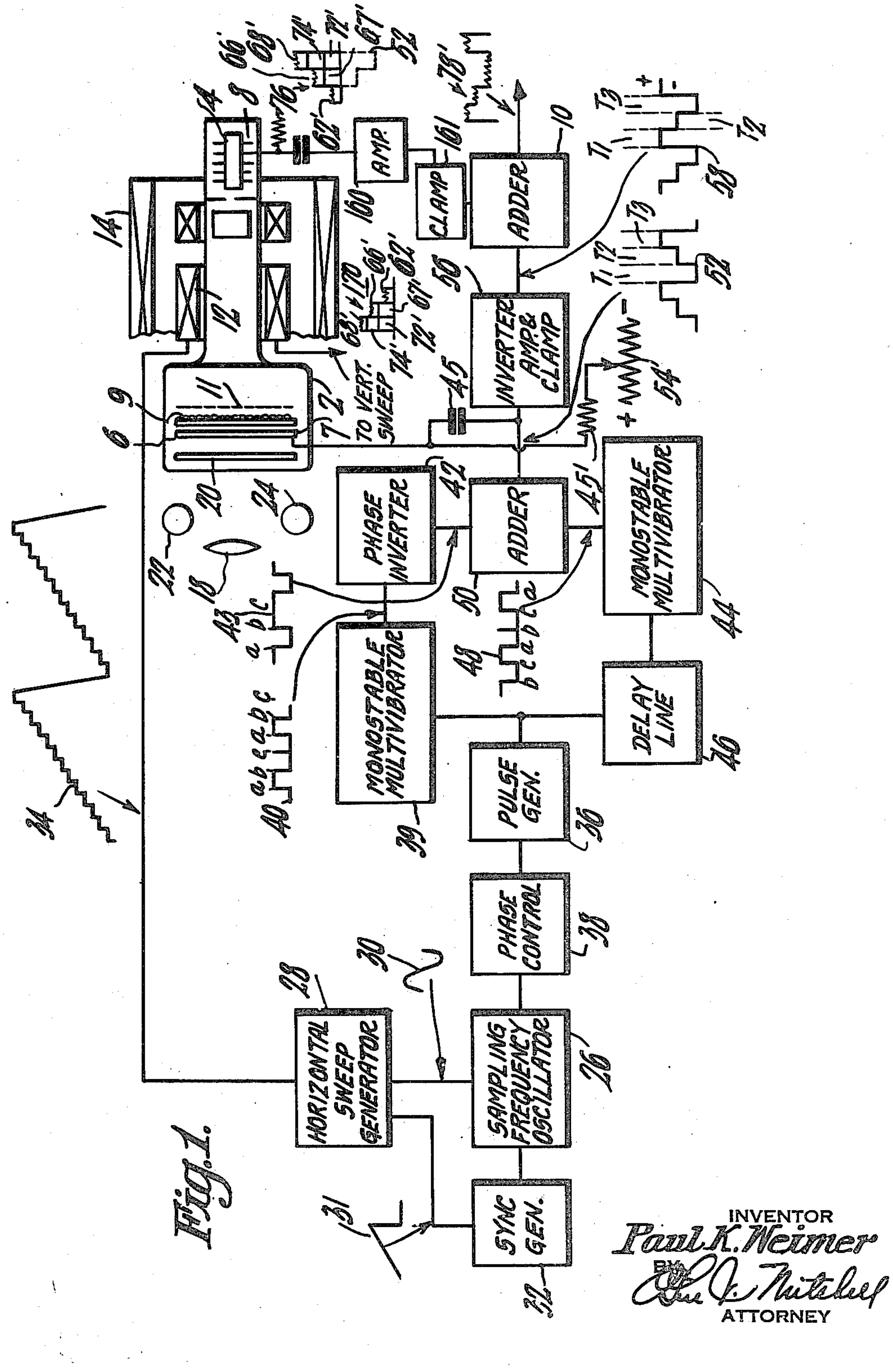
Figure 1 illustrates by block diagram an embodiment of the invention wherein the final color signal successively represents the intensities of the primary colors a plurality of times during each line scanning interval.

In Figure 1 there is shown a camera tube 2 which may be of the orthicon type having a low velocity scanning beam. The beam is projected by a gun 4 towards the target comprised of a signal plate 6 and a photoemissive surface 9 that is separated from the signal plate by insulating material 7. Those electrons not required for discharging the photoemissive surface 9 are picked up by an electron multiplier 8. The output of the electron multiplier is inverted in polarity in an amplifier 160 and is clamped at the black level by a clamp circuit 161 providing a stepped signal illustrated graphically in curve 76. This voltage wave is applied to an adder 10. The scanning beam is caused to scan a raster by the action of a standard deflection yoke 12 and is focussed by a standard focussing coil 14. In order that the charges on the photoemissive surface 9 or charge storage target may have a minimum effect upon the path followed by the beam a screen 11 is placed in front of the photoemissive surface 9 and is maintained at a potential that is positive with respect to the photoemissive surface 9. Light from the scene to be televised is focussed onto the photoemissive surface 9 by any suitable optical system 18, and a color filter 20 is inserted between the lens 18 and the photoemissive surface so that any particular area of the surface receives light from only one color band. Although various configurations of the optical filter may be employed, a single and effective design is one wherein the filter consists of a plurality of strips and wherein adjacent filter strips pass different primary colors. The strips may be oriented in any way with respect to the scansion of the beam.

In order that the areas in registry with the different color strips of the optical filter 20 may be charged or biased to different levels, the optical filter 20 is illuminated with red light from a source 22, and with green light from a source 24. In the particular arrangement of Figure 1 the red bias light 22 may be adapted to raise the potential of the red areas of the photoemissive surface 9 by four volts during a frame interval and the green bias light 24 may be adapted to raise the potential of the green areas of the surface 9 by two volts during the same period of time. Other bias potentials may be employed but the values selected may be used to achieve satisfactory results.

A sine wave 30 of a frequency equal to the desired repetition frequency of one primary color is supplied by a sampling oscillator 26. A standard sawtooth deflection wave 31 is supplied by any known type of sync generator 32. The two waves are combined in a sweep generator 28 of the type such as described in "Radio Electronic Engineering," volume 9, No. 1, July 1947, so as to produce a sweep wave 34. The duration of each level in the wave 34 is equal to the one cycle of the sampling frequency supplied by the oscillator 26. The wave 34 is applied to the portion of the yoke 12 that produces horizontal scansion of the beam. Because of the stairstep shape of the wave 34, the beam comes to rest at different points along the horizontal line for an interval equal to the time duration of one cycle of the sampling frequency supplied by the oscillator 26. At the end of this interval, the beam is rapidly moved by an amount determined by the vertical amplitude of one of the steps in the wave 34 and comes to rest for another interval. This "jump scanning" is carried on until the beam reaches the extreme edge of the target at which point it retraces to its initial position.

The sampling wave supplied by the oscillator 26 is also supplied to a pulse generator 36 via a phase control 38. Pulses of sampling frequency are supplied by the pulse generator 36 so as to trigger a monostable multivibrator 39 and produce a wave 40. The output of the multivibrator 39 is passed through a phase inverter 42 so as to produce a wave 43. The pulses from the pulse generator 36 are also supplied to another monostable multivibrator 44 via a delay line 46. The output of the multivibrator 44 is indicated by the wave 48. Similar lower case letters of the waves 40, 43 and 48 indicate corresponding instants of time. It will be seen therefore that when the wave 43 is added to the wave 48 in an adder 50, the resulting wave will be as indicated by the wave 52. This wave 52 is coupled via a condenser 45 to the signal plate 6 so as to be combined with a direct current potential supplied by a potentiometer 54 through the resistor 45', and is applied to the signal plate 6 in the cathode ray tube 2. The wave 52 is also passed through a variable gain inverting amplifier 56, and appears as wave 58 which is applied to the adder 10 with such polarity that it is effectively subtracted from the signals supplied to the adder 10 from the clamp circuit 121.

In the orthicon tube illustrated in Figure 1, the photoemissive surface 9 becomes positively charged in proportion to the amount of light striking it.

If the beam of electrons projected by electron gun 4 has sufficient current, it can completely discharge all portions of the target that are positive with respect to the cathode each time it comes to rest. Immediately after the beam leaves a spot the potential of the spot has the same potential as the cathode in the electron gun 4. This spot is then charged positively by any bias light falling on it as well as by any scene light falling on it until the beam again lands on the spot. Those electrons of the direct beam not attracted to neutralize the photoemissive surface 9 return to the collector 8. The number of electrons extracted from the beam, or in other words the electron current flowing from the beam to the surface 9, is illustrated as a function of time by the graph 76. The beam current flowing to the collector 8 is the difference between the original constant current in the direct beam projected toward the surface 9 by the electron gun 4 and the neutralizing current flowing to the surface 9 as illustrated by the graph 76. If there is no light on the target all the current in the beam returns to the collector 8 and has a "dark current" value depending on the strength of the beam projected by the electron gun 4.

The operation of the invention as illustrated in Figure 1 is as follows. Because of the capacitative coupling between the signal plate 6 and the photoemissive surface 9, the latter follows the voltage changes of the wave 52 that is applied directly to the former. The periods during which the beam is at rest may be divided into three parts, $T_1$, $T_2$ and $T_3$. $T_1$ corresponding to the duration of the first and lowest step of the wave 52, $T_2$ corresponding to the middle step and $T_3$ corresponding to the most positive step.

Let us assume that the beam has just come to rest on an arbitrarily selected spot. If the beam has sufficient current, it can neutralize any positive charge appearing on the spot during any one of the periods $T_1$, $T_2$ or $T_3$. Thus even when the surface 9 and hence the spot struck by the beam is raised to its most positive potential by the voltage wave 52 during the period $T_3$, the spot is discharged to cathode potential at the end of the period $T_3$. At the same instant the beam moves to the next spot and any light falling on the spot starts charging it in a positive direction.

The optical filter 20 may be comprised of a plurality of groups of parallel strips, and each strip of a group may be such as to transmit light of a different selected component color. The width of each group of strips may be equal to or less than the diameter of the beam. The centering of the beam may be such that the spots where it comes to rest are each in registry with a different one of the groups of filter strips, but this is not necessary.

Thus, until the beam comes back to the arbitrarily selected spot, a first portion of the spot is charged in a positive direction by red light from the scene as well as red light from the red bias light 22, a second portion is charged in a positive direction by green light from the scene as well as green light from the green bias light 24, and a third portion of the spot is charged in a positive direction by blue light from the scene. It will be remembered that there was no blue bias light. In this example, the red bias light 22 has sufficient intensity to charge the red portions of the target by 4 volts in the time it takes the beam to return to the same spot, and the green bias light 24 is of sufficient intensity to charge the green portion of all the target by 2 volts. Thus, just before the beam returns to the selected spot, the relative potentials of the red, green and blue portions of the spot may be as indicated by graph B of Figure 2, wherein the shaded areas 62, 66 and 68 represent the positive charge due to arbitrarily selected amounts of scene light, and the 4 volt, 2 volt and 0 volt pedestals on which the shaded areas are superimposed correspond to the charges induced by the bias lights. If the surface 9 were not changed in potential by the voltage wave 52 the potential distribution represented by the graph B would be positive with respect to the cathode potential 70. However, just before the beam again comes to rest on the spot, the voltage wave 52 lowers the potential of the surface 9 by 4 volts, and so the potential of the various portions of the target with respect to the cathode potential 70 is as illustrated in graph "B." This potential drop of four volts that is brought about by the voltage wave 52 exactly counteracts the increase in potential caused by the red bias light 22 and represented by the pedestal under the charge due to the red scene light 62. Therefore, only the charge 62 is positive with respect to the potential 70 of the cathode of the electron gun 4, and according to the theory of low velocity tubes set forth above, the neutralizing current flowing to the surface 9 from the direct beam is, during the period $T_1$, proportional to the charge 62. This neutralizing current is illustrated by 62′ of the graph 76 shown in Figure 1. If the portion of the direct beam striking the "red" area has sufficient current to fully discharge that portion by 2 volts during the interval $T_1$, and if the scene light is limited in intensity so that its maximum value cannot charge the target by more than two volts, then at the end of the period $T_1$, all the charge due to the red scene light will be neutralized and the potential of the various portions of the spot on which the beam is resting will be as indicated by the portion of the graph "B" that is below the cathode potential line 70.

At the beginning of the period $T_2$, the whole surface 9 is increased in potential by 2 volts by the voltage wave 52 so that the potential of the different portions of the spot are as indicated by the graph "C." During this period then the neutralizing current will be such as to discharge 2 volts of pedestal that are in the red areas and the charge 66 caused by the green scene light as indicated by the numerals 66′ and 67′ of the graph 76.

Figure 2:
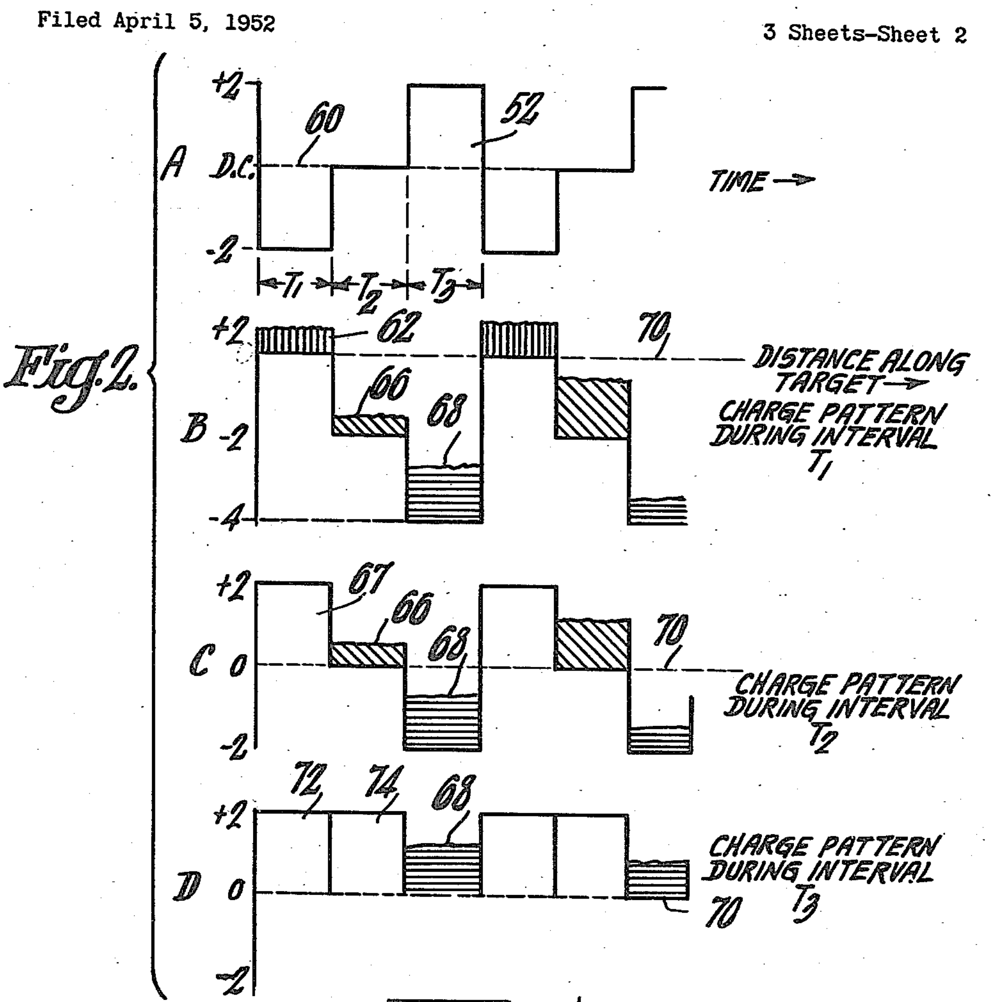
Figure 2 is a series of graphs useful in the explanation of the operation of the invention.

At the end of the period $T_2$ the voltage of the whole surface 9 is raised 2 volts for the duration of the period $T_3$ so as to produce a charge pattern indicated by graph "D" of Figure 2. The remaining 2 volts 72 of the 4 volt pedestal in the red portion of the spot, the 2 volt pedestal 74 in the green portion of the spot and the charge 68 due to the blue scene light produce corresponding neutralizing currents 72′, 74′ and 68′ as indicated in the graph 76.

In summation it can be said that the neutralizing current extracted from the direct beam of electrons during the periods $T_1$, $T_2$ and $T_3$ when the beam is at rest on one spot corresponds to the potential above the cathode potential 70 in the graphs B, C and D respectively. This current is represented as a function of time by the graph 76 of Figure 1. The return beam current arriving at the collector 8 is the difference between the direct beam current and the neutralizing current flowing to the photoemissive surface 9. If the output of the collector is coupled through a load impedance L to a fixed potential, the voltage developed across the impedance is proportional to the return beam current. If this voltage is inverted in polarity by an A. C. coupled amplifier 160 and then clamped at the black level by a clamp 161, the voltage applied to the adder 10 is proportional to the neutralizing current and therefore may also be represented by the graph 76.

As only the variable signals 62′, 66′ and 68′ that are proportional to the red, green and blue scene light are desired, means are provided for subtracting the signal components 67′, 72′ and 74′ from the signal output of the clamp 121. These latter components were caused by the charge set up by the bias lights. One way of accomplishing this is to subtract the voltage wave 52 from the output of the clamp 161. This voltage wave is inverted and clamped at its upper level by an amplifier and clamp 56 so as to produce a wave 58. The gain of the amplifier is such that the peak-to-peak amplitude of the wave 58 is the same as the peak-to-peak amplitude of the wave produced at the output of the clamp 161 when the wave 52 also is applied to the signal plate. During the period $T_1$, the wave 58 has a value of zero and does not affect the red signal 62′. This is desired because the red signal was recovered by itself and was not affected by pedestals. However, during the period $T_2$ the green signal 66′ is combined with a pedestal signal 67′ and can be recovered if the wave 58 is negative and has an amplitude equal to the pedestal signal 67′ at the adder 10. The blue signal is recovered in the similar manner during the period $T_3$.

Although the changes in potential produced when the neutralizing current flows through the resistor 45′ are coupled by the condenser 45 to the input of the inverting amplifier 56, the voltage changes produced by the neutralizing current are of the order of millivolts so that their interference with the step wave 52, which is in the order of volts, is negligible.

Figure 3:
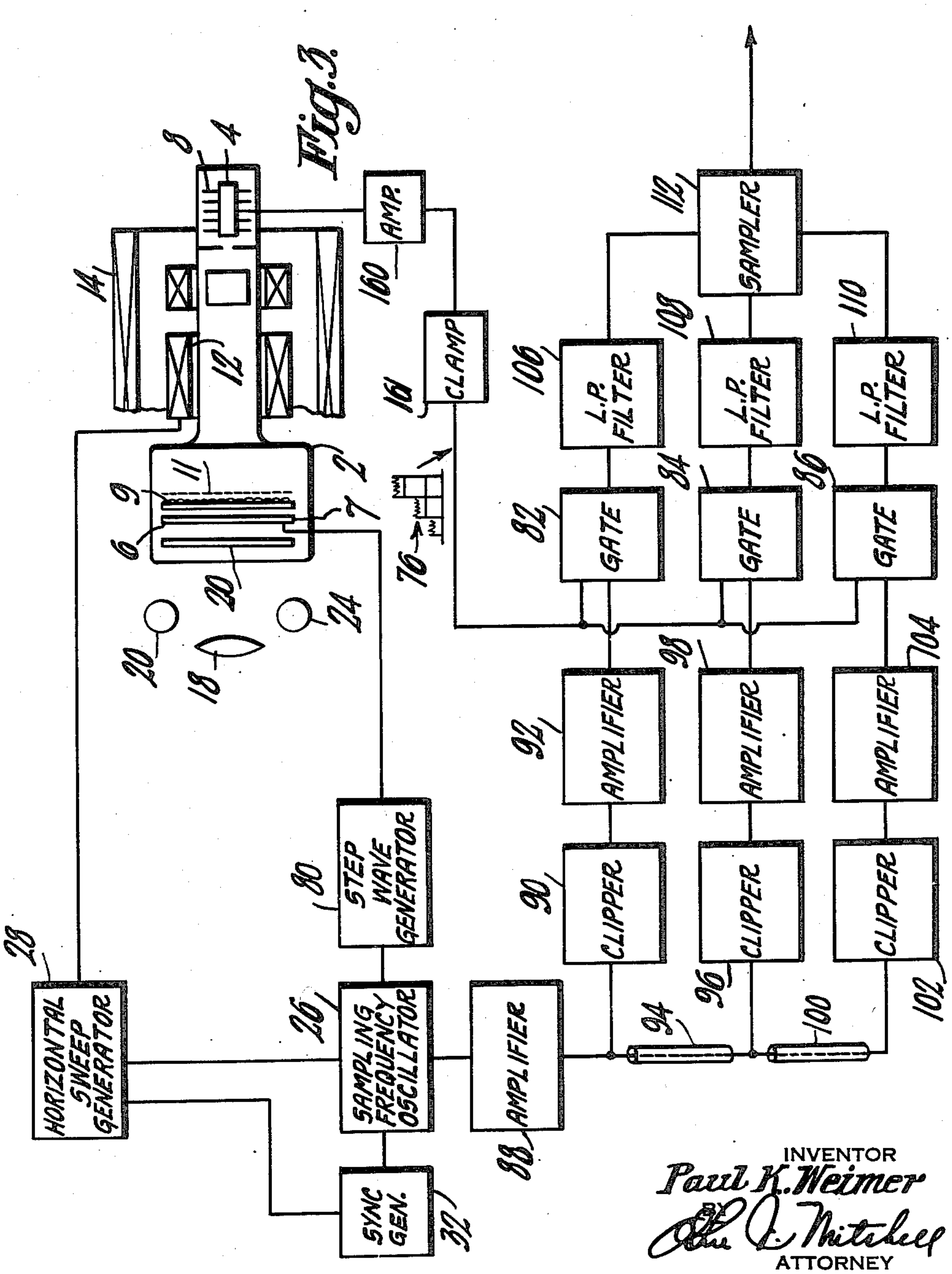
Figure 3 illustrates by block diagram an embodiment of the invention wherein each of the color signals is simultaneously available.

The apparatus shown in Figure 3 derives signals in the same manner as that described in connection with Figure 1, but it is provided with a different means for subtracting out signal components 67′, 72′ and 74′ that would otherwise be produced by the bias lights 22 and 24. For purposes of simplicity, those parts having corresponding functions are indicated by the same numerals as in Figures 1 and 3. The phase control 38, the monostable multivibrators 39 and 44, the delay line 46, the phase inverter 42, and the adder 50 are all included in a block 80 labeled "step wave generator." The signal supplied by the cathode ray tube multiplier 8, the amplifier 120 and the clamp 121 may again be indicated by a graph 76.

This signal is applied to each of three gates 82, 84 and 86. The sampling wave supplied by the sampling oscillator 26 is coupled via an amplifier 88, a clipping circuit 90 and an amplifier 92 to the gate 82. After passing through a delay line 94, the sampling frequency passes through another clipping circuit 96 and an amplifier 98 to the gate 84. The amount of delay provided at the delay line 94 is equal to one third of the time duration of one cycle of the sampling frequency. Accordingly, the pulses formed by the clipping circuit 96 arrive at the gate 84 during the interval $T_2$. A delay line 100 further delays the sampling frequency by one-third of a cycle and it is formed into pulses by a clipping circuit 102 and an amplifier 104 supplied to the gate 86.

The gates 82, 84 and 86 may be biased beyond cut-off by an amount exceeding the maximum peak of the signal wave form 76. If the gain of the amplifiers 92, 98 and 104 is suitably adjusted, the amplitude of the pulses supplied by them to their respective gating circuits when added to the unwanted components of the signal 76 may be sufficient to just bring the gate tube up to cut-off. Thus only the desired portions 62′, 66′ and 68′ of the signal 76 will pass through the corresponding gates 82, 84 and 86. These signals may be integrated in low pass filters 106, 108 and 110 and resampled at any desired frequency in a sampler 112. Furthermore, a brightness signal may be derived by supplying the outputs of the low pass filters to a single channel.

Figure 4:
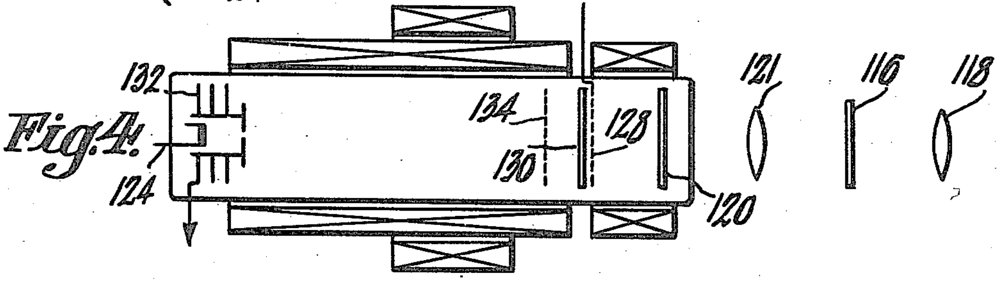
Figure 4 illustrates the application of the invention to an image orthicon.

In the embodiment of the invention shown in Figure 1 the camera tube 2 was of the orthicon type. This invention may also be applied to a pickup tube of the image orthicon type as shown in Figure 4. Light from the scene may be focussed onto a color strip filter 116 by an object lens system 118. The color strip filter 116 is focussed in turn onto a photocathode 120 by a relay lens 121. Normally, the photocathode 120 is operated at a negative potential with respect to the cathode 124 of the electron gun. A signal plate 128, in the form of a fine mesh target screen, generally operated a few volts positive with respect to the cathode 124, and therefore considerably positive with respect to the photocathode 120, serves to accelerate electrons emitted by the photocathode. In a manner well known to those skilled in the art, a thin sheet 130 of dielectric material such as lime glass placed on the beam side of the target screen 128 is positively charged by secondary emission in proportion to the number of electrons striking it. A beam of low velocity electrons is scanned over the dielectric 130 by any suitable means and neutralizes any positive charge produced thereon. In practicing the present invention with the image orthicon, the step wave 52 is applied to the target screen or signal plate 128 and the output signals may again be derived from an electron multiplier 132. The operation is identical to the operation described in connection with Figure 1 wherein bias lights serve to charge the different color areas of the scanned surface to different potentials. In order to prevent the differently charged color areas on the dielectric 130 from bending the beam, a screen 134 may be inserted between the dielectric 130 and the electron gun so as to increase the axial field existing immediately on the gun side of the dielectric. The color line filter 116 could have been built inside the tube as shown in Figure 1, in which case it would be mounted adjacent to the photocathode.

Figure 5:
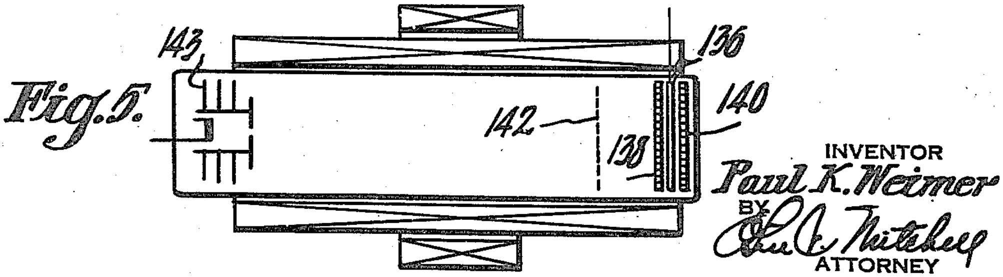
Figure 5 illustrates the application of the invention to a Vidicon.

Figure 5 illustrates the basic elements of a Vidicon tube. The inner surface of a transparent signal plate 136 is coated with a layer 138 comprised of strips of photoconducting material. The signal plate and photoconductor comprise the target. Light from the scene is broken up into its primary components by a color strip filter 140 that may be inserted in the tube in the position shown. Beam bending may be avoided by the presence of a grid or screen 142 that serves to increase the axial field at the beam side of the mosaic 138. The color switching step wave 52 may be applied to the transparent signal plate 136 and the signals may be derived from the electron multiplier 143 as before.

However, as an alternative to employing bias lights to establish the different color areas at different potentials when no scene light is present, photoconducting materials having different dark currents may be employed in the different color areas. The whole surface of the target would be negatively charged with respect to the cathode of the electron gun by 4 volts at the beginning of the interval $T_1$ by the action of the wave 52 in a manner similar to that described in connection with Figure 1. Thus in the red areas, a photoconductive material is used which has enough conductivity, when no scene light is present, to pass enough electrons from the beam side of the target 138 to the signal plate during a frame period to charge the beam side of the target in a positive direction by 4 volts. The photoconductive material used in the green areas conducts sufficient electrons in a frame period to charge the beam side of the target in registry with the green areas to 2 volts. The dark current in the blue areas is substantially zero. Thus the charge condition of the mosaic 130 corresponds to that illustrated by the graphs "B," "C" and "D" of Figure 2.

In each of these embodiments, different color areas of a target, which is a surface scanned by the beam, are charged to different potentials independently of any scene light. In the embodiments of the invention employing the orthicon and the image orthicon tubes, the means for biasing the different color areas of the target is comprised of bias lights. In the embodiment employing a Vidicon, the biasing means can be built into the tube by using materials of different dark currents in the different color areas.

In all these embodiments the signal could be extracted in other well known ways such as across an impedance connected in series with the signal plates.

In any of the arrangements shown above, the separate color signals can be derived at either an elemental rate or line rate by changing the frequency of the step wave of voltage 52 that is applied to the signal plate of the target structure.

In the discussions above, the nature of the electron beam has been somewhat idealized in that it has been assumed that the electrons are uniformly distributed across the beam. As is known to those skilled in the art, this is generally not the case and accordingly the outer fringes of the beam may not have sufficient current to discharge areas during the time allotted. This leads to the introduction of a certain percentage of one color information onto either or both of the other two, and can be corrected by subtracting out from a given color channel proper proportions of the other two colors. Apparatus for performing such subtraction may be found in the U. S. Patent 2,566,693 issued to Cherry on September 4, 1951. Whereas the use of such subtraction apparatus is not absolutely necessary, it may be helpful in eliminating any cross-talk that may occur in the use of the present invention. Furthermore, if the color strips are thin enough, a plurality of groups of them may lie in the portion of the beam that is able to completely discharge them and the partial discharges by the fringe areas would have less effect.

In the previously discussed arrangements, the means for sequentially neutralizing the charges on the photoemissive surface that represent the different selected component colors has applied a step wave 52 to the signal plate 6. The following discussion relates to a method of operating the apparatus of Figure 1 without applying any step wave to the signal plate. This can be effected by adjusting the current density in this beam so that it is capable of discharging any area it strikes so as to change its potential by a given number of volts in one third of the period during which the beam is at rest. If the number of volts is 2, then the bias lights can be adjusted as before so as to yield a charge distribution as indicated in the graph "B" of Figure 2 wherein the areas 68, 66 and 62 represent the blue, green and red scene light. All areas are positive with respect to the cathode potential 70 as the step wave 52 is not coupled to the signal plate. The voltages produced at the output of the clamp circuit 161 as a function of time are illustrated in the graph 170 of Figure 1. During the discharge period $T_1$, the charge 68 that is produced in response to the blue scene light causes a voltage 68'. During the same period, voltages 74' and 72' are produced in response to the discharge of the red and green areas by 2 volts. During period $T_2$, the charge 66 caused by the green scene light is neutralized so as to produce a voltage 66'. In addition, 2 volts of charge are again removed from the red areas so as to produce a voltage 67'. The only charge on the spot is now the charge 76 that is produced by the red scene light, and this is neutralized during the period $T_3$ so as to produce an output voltage 62' as shown in the graph 170.

A comparison of the graph 170, which indicates the type of signal produced when the invention is operated in the manner just described, with the graph 78 that indicates the type of signal developed when the first method of operation is employed shows that the signals derived represent the selected component colors in reverse order. In the first method of operation the order of color representation was red, green and blue whereas the present order is blue, green and red. It can also be seen that the voltages produced by discharging the charges caused by the bias lights is also reversed. Therefore, the inverter amplifier 56 is omitted. The clamp still operates as before so that a voltage wave 52 is applied to the adder 10. The wave is seen to be the negative of the voltage produced by the bias lights.

What is claimed is:

1. Apparatus for deriving a plurality of independent image-representative signals during a single scansion of a charged surface comprising in combination a cathode-ray tube having a charge storage target comprising a plurality of elemental areas, means including a cathode for directing a beam of electrons toward said target, means for causing said beam to jump scan along a series of lines on said target whereby at periodic intervals during the scanning of each of said lines said beam effectively comes to rest, means for permitting light of different component colors to charge different portions of each of said elemental areas, means for charging said different portions to different bias potentials independently of any light from said image, means for changing the electrostatic potential of said target with respect to said cathode a plurality of times during each interval of time that the beam comes to rest, and means for extracting signals from said beam in response to the discharge of said portions by said beam.

2. Apparatus as described in claim 1 wherein there is provided means coupled to said signal extracting means for subtracting out components of said signals representative of said bias charges.

3. Apparatus for deriving a signal that successively represents the intensities of different primary colors of light as a scene is scanned comprising in combination a cathode ray tube having a photo-sensitive target, an electron gun including a cathode, and means for directing a low velocity beam of electrons toward said target, said tube also having an electron collector adapted to collect electrons not extracted from the beam by said target, beam deflection apparatus, means for energizing said beam deflection apparatus so as to cause said beam to jump scan along a series of parallel lines on said target whereby at periodic intervals during the scanning of each of said lines said beam effectively comes to rest, a color strip filter mounted between the scene and said target and bias lights of different intensity for all but one of the primary colors mounted so as to direct their light to said target via said color strip filter.

4. Apparatus as described in claim 3 wherein means are provided for changing the voltage of said target in incremental steps each time the beam comes to rest.

5. Color television pickup apparatus for deriving signals that successively represent the intensities of different primary colors of light as a scene is scanned comprising in combination a cathode ray tube having photo-sensitive apparatus including a target comprising a plurality of elemental areas for developing a charge pattern on said target representative of light from said scene, means including an electron gun for directing a low-velocity beam of electrons toward said target, said tube also having an electron collector adapted to collect electrons not extracted from the beam by said target, means for causing said beam to jump scan along a series of parallel lines on said target whereby at periodic intervals during the scanning of each of said lines said beam effectively comes to rest, and optical filter means associated with said photo-sensitive apparatus through which the light from said scene passes, said filter means being such as to permit light of each of said primary colors to develop a representative charge on a respectively different portion of each of said elemental areas.

6. Apparatus in accordance with claim 5 which includes means for developing different bias charges on said different portions of each elemental target area independently of light from said scene.

7. Apparatus as described in claim 6 wherein said bias charge developing means comprises bias lights of different intensity for all but one of said primary colors mounted so as to direct their light to said photo-sensitive apparatus via said optical filter means.

8. Apparatus in accordance with claim 6 wherein the effective cross-sectional area of said beam is of a magnitude such that the beam effectively comes to rest upon a plurality of said different portions during each of said periodic intervals.

9. Apparatus in accordance with claim 8 which includes means for changing the potential of all of said different portions by an equal amount a plurality of times during each of said periodic intervals.

References Cited in the file of this patent

UNITED STATES PATENTS

| Number | Name | Date |
|---|---|---|
| 2,458,649 | Schade | Jan. 11, 1949 |
| 2,579,971 | Schade | Dec. 25, 1951 |